United States Patent
Omori et al.

(10) Patent No.: US 7,368,074 B2
(45) Date of Patent: May 6, 2008

(54) METHOD FOR MANUFACTURING AUTOMOBILE WEATHER STRIP

(75) Inventors: Hitoshi Omori, Nishikasugai-gun (JP); Masanori Aritake, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 452 days.

(21) Appl. No.: 11/012,193

(22) Filed: Dec. 16, 2004

(65) Prior Publication Data

US 2005/0112301 A1 May 26, 2005

Related U.S. Application Data

(62) Division of application No. 09/798,890, filed on Mar. 6, 2001, now Pat. No. 6,896,954.

(30) Foreign Application Priority Data

Mar. 6, 2000 (JP) ............................. 2000-60000
Sep. 13, 2000 (JP) ............................. 2000-278062

(51) Int. Cl.
  *B29C 44/06* (2006.01)
  *B29C 44/24* (2006.01)
(52) U.S. Cl. ................. 264/45.9; 156/306.6; 264/45.1; 264/321
(58) Field of Classification Search ............ 156/306.6; 264/45.1, 45.9, 321
See application file for complete search history.

(56) References Cited

U.S. PATENT DOCUMENTS 3,903,350 A    9/1975   Baird
4,537,825 A    8/1985   Yardley
4,576,860 A    3/1986   Fink et al.
4,643,926 A    2/1987   Mueller
5,123,988 A    6/1992   Iwasa (Continued)

FOREIGN PATENT DOCUMENTS

DE    4219314    12/1992

(Continued)

OTHER PUBLICATIONS

Patent Abstract of Japan 59-178237 (Oct. 1984).

(Continued)

*Primary Examiner*—Allan R. Kuhns
(74) *Attorney, Agent, or Firm*—Posz Law Group, PLC

(57) ABSTRACT

An automobile trim has a trim body (a base layer) formed of a rubber composition and having a design surface, a decorating layer formed of a thermoplastic elastomer composition and thermally bonded integrally with the design surface of the trim body. A thermal bonding layer is formed of a thermoplastic resin composition and interposed between the decorating layer and the trim body so that the decorating layer is thermally bonded integrally with the trim body through the thermal bonding layer. The thermal bonding layer has a thickness to an extent not to prevent bending flexibility when the trim is attached to a vehicle body. In another example, a cushion layer is laminated on the trim body and formed of sponge rubber of EPDM, a decorating layer is laminated on the cushion layer and formed by foaming olefin thermoplastic elastomer, and an olefin bonding layer for bonding the cushion layer and the decorating layer.

4 Claims, 6 Drawing Sheets

U.S. PATENT DOCUMENTS

| | | |
|---|---|---|
| 5,143,772 A | 9/1992 | Iwasa |
| 5,332,600 A | 7/1994 | Iwasa |
| 5,353,154 A | 10/1994 | Lutz et al. |
| 5,411,785 A | 5/1995 | Cook |
| 5,415,822 A | 5/1995 | Cook |
| 5,456,976 A | 10/1995 | LaMarca et al. |
| 5,489,461 A | 2/1996 | Iwasa et al. |
| 5,512,601 A * | 4/1996 | Halberstadt et al. .......... 521/79 |
| 5,686,165 A | 11/1997 | Cook |
| 5,690,768 A | 11/1997 | Iwasa et al. |
| 5,753,063 A | 5/1998 | Sakakibara et al. |
| 6,024,906 A | 2/2000 | Cook |
| 6,110,546 A | 8/2000 | Honda et al. |

FOREIGN PATENT DOCUMENTS

| | | |
|---|---|---|
| DE | 19902840 | 10/1999 |
| EP | 0 372 745 | 6/1990 |
| EP | 0 390 568 | 10/1990 |
| EP | 0443462 | 8/1991 |
| EP | 0917950 | 5/1999 |
| GB | 2309197 | 7/1997 |
| JP | A-H06-16094 | 1/1994 |
| JP | A-H08-230013 | 9/1996 |
| JP | A-H09-193299 | 7/1997 |
| JP | A-H11-277027 | 12/1999 |
| WO | WO 01/96135 A2 | 12/2001 |

OTHER PUBLICATIONS

Patent Abstract of Japan 62-227838 (Oct. 1987).

* cited by examiner

METHOD FOR MANUFACTURING AUTOMOBILE WEATHER STRIP

CROSS REFERENCE TO RELATED APPLICATIONS

This application is a divisional application of U.S. patent application Ser. No. 09/798,890, filed Mar. 6, 2001, now U.S. Pat. No. 6,896,954, which is based on Japanese Patent Application Nos. 2000-60000 filed on Mar. 6, 2000 and 2000-278062 filed on Sep. 13, 2000, the contents of which are hereby incorporated by reference.

BACKGROUND OF THE INVENTION

1. Field of the Invention

The present invention relates to an automobile trim in which a decorating layer is formed of a TPE (thermoplastic elastomer) composition and integrated with a design surface of a trim body which is formed of a rubber composition.

Here, a weather strip (automobile trim) having a trim portion and a seal portion will be mainly described as a product to which the present invention is applied, by way of example. The present invention is applicable also to a weather strip of another type, such as a glass run having a trim portion, or the like. Further, the present invention is applicable also to an automobile trim having only a trim portion without having any seal portion.

The present application is based on Japanese Patent Applications Nos. 2000-60000 and 2000-278062, which are incorporated herein by reference.

2. Description of the Related Art

A trim portion and a seal portion of a weather strip are usually manufactured using EPDM (ethylene-propylene-diene copolymer) compositions of a solid recipe and a foam recipe, respectively, by two-layer extrusion (co-extrusion) by using a two-layer extruder. The reason why such EPDM compositions are used is that they are superior in weatherability and elasticity and low in specific gravity so that they can contribute also to making the weather strip light in weight. A sulfuric vulcanizer which is a general-purpose vulcanizer is usually used for vulcanizing the EPDM compositions. That is because hot-air vulcanization used for continuous vulcanizing extruded products is applicable to the sulfuric vulcanizer differently from other general-purpose vulcanizers of peroxides.

Then, for forming the decorating layer in the trim portion, there are methods in which a decorating layer composed of TPE (composition), which has not solidified yet, is laminated and integrated on the surface of a trim body (base layer) by thermal bonding without using any bonding agent (U.S. Pat. No. 4,537,825, European Patent No. 0372745, and Unexamined Japanese Patent Publication No. Hei. 8-230013). These methods are more superior in productivity to conventional methods in which a soft thermoplastic resin sheet is cut out and bonded by a bonding agent so as to form a decorating layer. Here, the reason why the decorating layer is formed of TPE is to ensure the easiness of bending when the trim portion of the weather strip is attached to a vehicle body flange or the like.

However, in the weather strip configured so that the decorating layer formed by the above-mentioned method has been thermally bonded integrally with the surface of the trim body, it has been found that the following problems occur in the decorating layer.

(1) The decorating layer is affected by the ground color of the trim body (base layer) so that the decorating layer is difficult to exhibit a required color. This is because a large quantity of carbon black as a rubber reinforcement is mixed into the solid-recipe EPDM composition for forming the trim body so that the solid-recipe EPDM composition has a high degree of blackness (chroma saturation).

(2) The decorating layer is affected by sunlight chronologically so that the decorating layer is apt to yellow. As the cause thereof, it has been confirmed that there is a high possibility that such yellowing is caused by the migration of a sulfuric vulcanizing agent (sulfur and vulcanizing accelerator thereof) in vulcanized rubber to the decorating layer (see Unexamined Japanese Patent Publication No. Hei. 9-193299).

The influence of the ground color and the yellowing degree in the decorating layer becomes more conspicuous if the coloring of the decorating layer is bright or pale. That is, in the above-mentioned weather strip (trim) configured so that the decorating layer has been thermally bonded with the trim body, it is difficult to meet a request of making the decorating layer bright or pale.

To prevent the decorating layer from yellowing easily, it has been proposed in the above-mentioned patent publication (Unexamined Japanese Paten No. Hei. 9-193299) that hydrotalcite as an anti-discoloring agent is mixed into the TPE composition for forming the decorating layer.

However, hydrotalcite is currently so expensive as to increase the total material cost of the weather strip. Therefore, other measures against the yellowing of the decorating layer without using hydrotalcite are desired.

Further, a technique disclosed in Unexamined Japanese Patent Publication No. Hei. 6-16094 has also been known as such another automobile weather strip. This weather strip has a rubber base, a decorating skin material, and a cushion layer. The rubber base is composed of solid rubber of EPDM (aforementioned solid recipe) which is a kind of EPR (ethylene-propylene rubber). The decorating skin material (aforementioned decorating layer) covers a portion of the rubber base in the area where the rubber base (layer) is exposed in the cabin of a vehicle. The cushion layer is formed of sponge rubber of EPDM (aforementioned foam recipe) between the decorating skin material and the base (layer). The cushion layer sinks following external force through the decorating skin material, and restores its original shape in response to the release of the external force. Thus, the cushion layer provides a soft feeling on the sense of touch.

However, the decorating skin material attached to the surface of the cushion layer is of cloth using precolored polyester fibers as raw material, or of a resin sheet material such as PVC. Therefore, a soft feeling on the external appearance cannot be obtained from the skin material itself. In addition, in either case of polyester or PVC, they have no adhesive property to the rubber base of EPDM. Accordingly, it is necessary to prepare a special bonding film having a two-layer structure with adhesive properties to bond to the skin material and the EPDM rubber base respectively. As a result, the manufacturing cost is increased. Further, in this weather strip, the cushion layer is provided only between the apex portion of the sectionally U-shaped rubber base and the skin material. An outside lip projecting on the car-interior side is formed of solid rubber alone. Therefore, a soft feeling cannot be obtained in this portion sufficiently. Thus, there has been a problem that a soft feeling and a sense of high quality cannot be obtained sufficiently as a car interior material.

SUMMARY OF THE INVENTION

In consideration of the aforementioned problems, it is an object of the present invention to provide an automobile trim which can reduce the influence of the ground color (black) of a trim body on a decorating layer, and which can further reduce the influence of a discoloring agent migrating from the trim body to the decorating layer.

It is another object of the present invention to provide an automobile weather strip which can provide a soft feeling not only on the sense of touch but also on the external appearance in the portion where a skin layer as a decorating layer is provided, and all over the surface, and which can be manufactured at a comparatively low price, and a method for manufacturing such a weather strip.

The present inventors made diligent efforts toward development in order to solve the foregoing problems. As a result, the present inventors found that when a decorating layer was thermally bonded with a trim body through a thermal bonding layer having a predetermined thickness, the influence of the ground color and the yellowing degree as described above could be reduced practically even if the thermal bonding layer was thin enough not to block the bending flexibility when the trim was attached to a vehicle body. Thus, the present inventors came to think out an automobile trim having the following configuration.

The automobile trim according to the present invention comprises: a trim body formed of a rubber composition and having a design surface; and a decorating layer formed of a thermoplastic elastomer composition (TPE composition) and thermally bonded integrally with the design surface of the trim body; wherein the decorating layer is thermally bonded integrally with the trim body through a thermal bonding layer formed of a thermoplastic resin composition between the decorating layer and the trim body, the thermal bonding layer having a thickness to an extent not to prevent bending flexibility when the trim is attached to a vehicle body.

With such a configuration, it is preferable that the thermal bonding layer has a thickness with which the ground color of the trim body can be hidden and further with which a discoloring agent including a sulfuric agent can be prevented from migrating from the trim body to the decorating layer.

In addition, it is preferable that base polymers of the TPE composition, the rubber composition and the thermoplastic resin composition are olefin TPE (TPO), ethylene-α-olefin-nonconjugate-diene copolymer rubber (EPDM), and olefin resin, respectively. Particularly, it is preferable that the base polymer of the thermoplastic resin composition is linear low-density polyethylene. The thickness of the thermal bonding layer in this configuration is usually in a range of from 40 μm to 300 μm, preferably in a range of from 80 μm to 150 μm.

Further, if the TPE decorating layer is of foam, the decorating layer can be thermally bonded integrally with the trim body without collapsing cells of the foam.

Further, there is provided an automobile weather strip comprising: an attachment base portion attached to a vehicle-body-side member and composed of solid rubber of EPR; a cushion layer laminated on the attachment base portion and formed of sponge rubber of EPR; a skin layer laminated on the cushion layer and formed by foaming olefin thermoplastic elastomer; and an olefin bonding layer for bonding the cushion layer and the skin layer.

The above automobile weather strip is attached to the vehicle-body-side member on the attachment base portion composed of solid rubber of EPR. The skin layer is attached onto the attachment base portion through the cushion layer and the bonding layer. The skin layer is a foamed layer so that it can provide a soft feeling on the external appearance. In addition, the cushion layer disposed under the skin layer is formed of sponge rubber of EPR, and provided substantially all over the portion where the skin layer is provided. Thus, the cushion layer can provide a soft feeling on the sense of touch. In addition, all of the attachment base portion, the cushion layer and the skin layer are formed of materials of olefin series so that they are thermally bonded with one another firmly. Thus, there is no fear that they peel off.

Still further, there is provided a method for manufacturing an automobile weather strip, comprising the steps of: extruding EPR to form an extrusion body as the attachment base portion and the cushion layer; vulcanizing the extrusion body; extruding foamable olefin thermoplastic elastomer to form the skin layer while extruding a skin sheet so that a bonding sheet composed of an olefin material for forming the bonding layer is interposed between the skin sheet and the cushion layer; and laminating the skin sheet, the bonding sheet and the extrusion body, respectively at the predetermined temperature, so as to keep cells of foam of the skin sheet, while laminating the skin sheet, the bonding sheet and the extrusion body and pressing the laminated three by rollers so as to thermal bond the skin sheet onto the cushion layer through the bonding sheet.

Features and advantages of the invention will be evident from the following detailed description of the preferred embodiments described in conjunction with the attached drawings.

DETAILED DESCRIPTION OF THE PREFERRED EMBODIMENTS

The aforementioned configurations of the present invention will be described below in detail, respectively. Incidentally, any compounding unit is a weight unit without notice.

Figure 5:
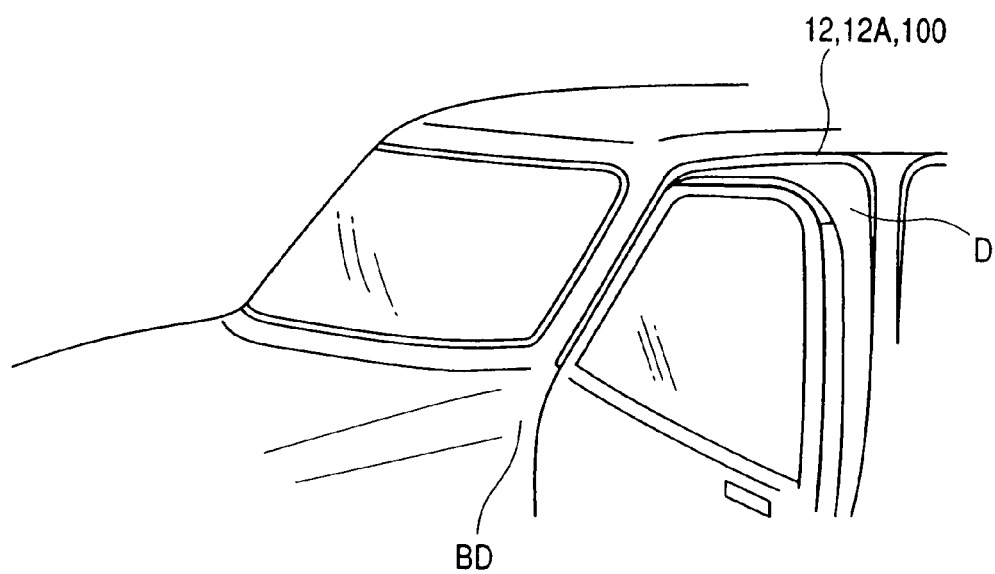
FIG. 5 shows an external appearance view showing an automobile body to which a weather strip has been attached.

FIG. 5 shows an external appearance view showing an automobile body BD to which a weather strip according to the present invention 12 or 12A has been attached.

Figure 1:
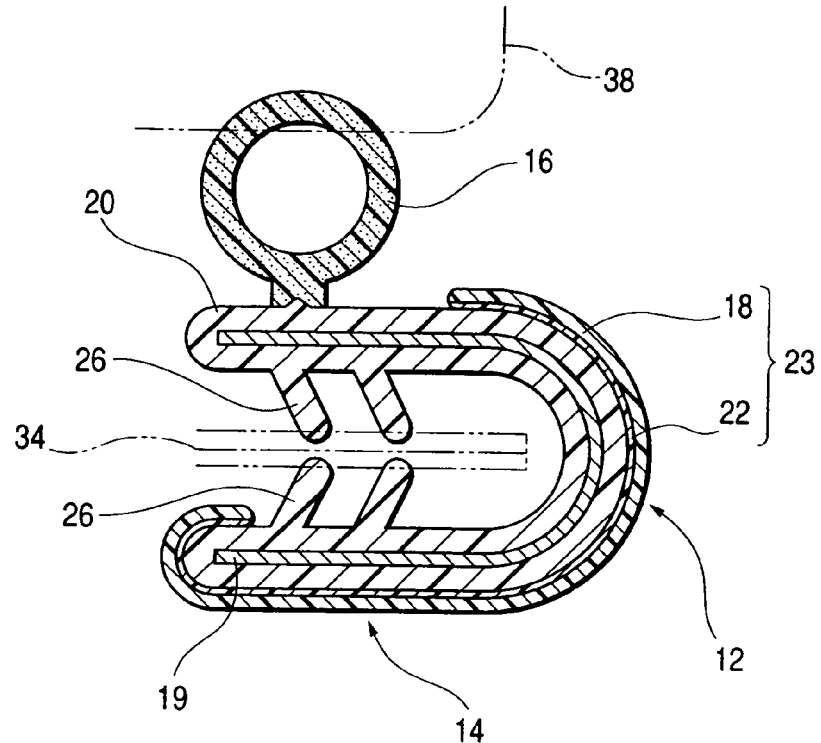
FIG. 1 shows a sectional view of an embodiment of a weather strip according to the present invention.
Figure 2:
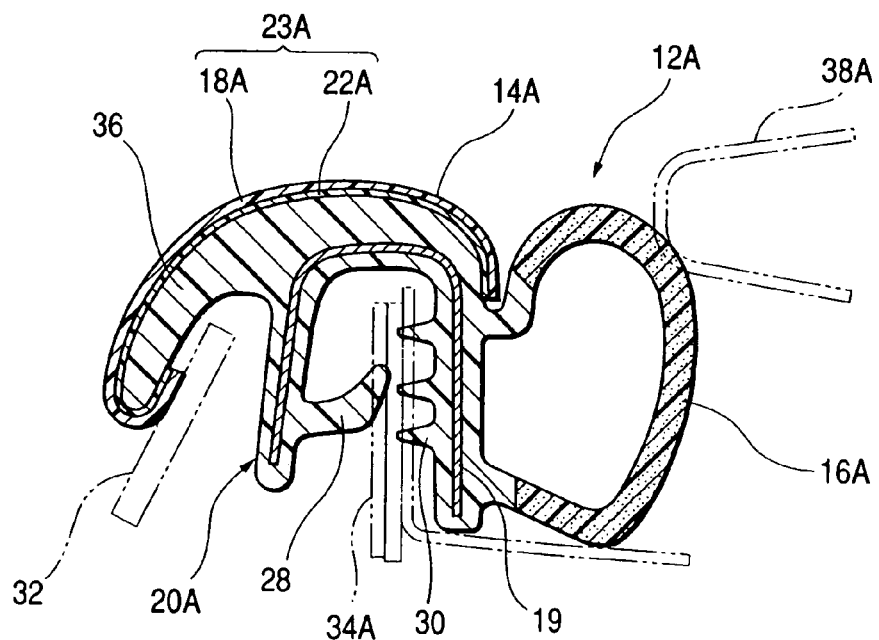
FIG. 2 shows a sectional view of another embodiment of a weather strip according to the present invention.

A weather strip 12 (12A) has a trim portion 14 (14A) and a hollow seal portion 16 (16A) as shown in FIGS. 1 and 2.

Here, the trim portion 14 (14A) has a basically U-shape in section which will be a flange holding portion in the illustrated embodiment. However, the present invention is applicable to a trim portion having another shape.

The trim portion 14 (14A) has two pairs of holding lip portions 26 and 26 in FIG. 1. On the other hand, in FIG. 2, the trim portion 14 (14A) has one pressing lip portion 28 on one side and three support lip portions 30 on the other side. Then, in FIG. 2, a covering lip 36 for covering a gap between an inner garnish 32 and a vehicle body flange 34 (34A) is provided to extend from the apex portion of the U-shape of the trim portion 14A. Incidentally, an insert metal-core 19 is embedded in the trim portion 14 (14A). An opening trim weather strip attached to the circumferential edge of a door opening portion in FIG. 1 will be described below by way of example. Parts similar to those in FIG. 2 are referenced correspondingly with the suffix "A", and description thereof will be omitted.

In the trim portion (trim) 14, a solid decorating layer 18 formed of a thermoplastic elastomer (TPE) composition is thermally bonded integrally with a design surface of a trim body (hereinafter referred to as "base layer") 20. The insert metal core 19 is embedded in the inside of the base layer 20, which is formed of a rubber composition. Then, a thermal bonding layer 22 formed of a thermoplastic resin composition is interposed between the decorating layer 18 and the base layer 20. Thus, the decorating layer 18 is thermally bonded integrally with the base layer 20 through the thermal bonding layer 22.

The rubber composition for forming the base layer 20 is usually made of a solid rubber recipe from the point of view of ensuring the shape retentivity of the trim portion 14. The rubber composition may be made of a fine foam recipe (the expansion ratio is not higher than 1.5) from the point of view of making the trim portion 14 light in weight. The hollow seal portion 16 is made of a sponge rubber (foamed rubber) recipe from the point of view of ensuring the elasticity and the sealing performance.

Examples of rubber polymers (base polymers) for the rubber composition include ethylene-α-olefin-nonconjugate-diene copolymer rubber (EPDM), styrene-butadiene copolymer rubber (SBR), chloroprene rubber (CR), etc. Particularly, EPDM is preferable from the point of view of durability, age resistance such as light resistance, ozone resistance, weather resistance, or the like, and making the trim portion 14 light in weight.

Examples of α-olefin in the EPDM include propylene, 1-butene, 1-pentene, 1-hexene, 4-methyl-1-pentene, 1-octene, 1-decene, etc. Of them, propylene is preferable. On the other hand, examples of nonconjugate diene include 1,4-hexadiene, dicyclopentadiene, 5-ethylidene-2-norbornene, etc.

Examples of preferable ethylene-α-olefin copolymer rubber include ethylene-propylen copolymer rubber, ethylene-propylene-ethylidene norbornene copolymer rubber, ethylene-propylene-dicyclopentadiene copolymer rubber, etc.

As a vulcanizer for the EPDM composition, a sulfuric vulcanizer which is a general-purpose vulcanizer is usually used as mentioned above.

Here, a sulfuric vulcanizing agent and a vulcanizing accelerator thereof are included in such a sulfuric vulcanizer. Examples of such sulfuric vulcanizing agents include active sulfur releasing organic vulcanizing agents as well as sulfur. Examples of the active sulfur releasing organic vulcanizing agents include morpholine disulfide, alkyl phenol disulfide, organic polysulfide copolymer, and further sulfur containing vulcanizing accelerators such as thiuram one, thiourea one, or the like. Further, in the present invention, a peroxide vulcanizing agent, a polyamine vulcanizing agent, etc. can be used together suitably in accordance with necessity.

In addition to the above-mentioned sulfuric vulcanizer, carbon black, process oil, lubricant, inorganic filler, age resistor, and other sub-materials are suitably mixed into the rubber composition so as to form an extrusion-molding rubber material for the base layer 20 by kneading or the like.

Incidentally, the vulcanizer for the rubber composition is not limited to the sulfuric vulcanizer, but it may be another vulcanizer such as a peroxide vulcanizer or the like.

As the base polymer of the TPE composition for forming the decorating layer 18 according to the present invention, if the base layer (trim body) 20 is formed of a non-polar rubber composition such as EPDM, non-polar TPE such as olefin TPE (TPO), styrene TPE (TPS), or the like, is used in the same manner as that in conventional one. Thus, the thermal bond properties of both the base layer 20 and the decorating layer 18 with the thermal bonding layer are ensured easily.

On the contrary, if the base layer is formed of polar rubber such as chloroprene rubber (CR), polar TPE such as vinyl chloride TPE, polyester TPE, polyamide TPE, or the like, is used.

Because the base layer is usually formed of EPDM, detailed description will be made about A. TPO and B. TPS which are preferable TPEs to be combined with EPDM.

A. TPO is typically made of olefin resin and ethylene-α-olefin copolymer rubber (EPR). The weight ratio of the former to the latter is in a range of from 10/90 to 90/10, preferably in a range of from 30/70 to 80/20.

Particularly, polypropylene is preferable as the olefin resin from the point of view of reducing the weight. Examples of α-olefin the carbon number of which is 2 or more include ethylene, 1-butene, 1-pentene, 3-methyl-1-butene, 1-hexene, 1-decene, 3-methyl-1-pentene, 4-methyl-1-pentene, 1-octene, etc. The olefin resin used has a melt flow rate (MFR; 2.16 kg load) usually in a range of from 0.1 g/10 min to 100 g/10 min, preferably in a range of from 0.5 g/10 min to 50 g/10 min.

As the ethylene-α-olefin copolymer rubber (EPR), ethylene-α-olefin copolymer rubber (EPM), ethylene-α-olefin-nonconjugate-diene copolymer rubber (EPDM), or the like, can be used. Here, as the α-olefin, the same as that in EPDM of the base layer can be used. Usually, propylene is used.

The weight ratio of ethylene to α-olefin is usually in a range of from 90/10 to 30/70, preferably in a range of from 85/15 to 45/55. When ethylene-α-olefin-nonconjugate-diene copolymer rubber is used, the content of nonconjugate diene is usually in a range of from 5 to 40 by iodine value. Incidentally, ethylene-α-olefin copolymer rubber and ethylene-α-olefin-nonconjugate-diene copolymer rubber may be used and mixed together. Further, oil extended rubber may be used.

The Mooney viscosity ($ML_{1+4}$ 100° C.) of the above-mentioned EPR is usually in a range of from 10 to 350, preferably in a range of from 30 to 300. If the Mooney viscosity is too low, the EPR may be inferior in mechanical strength such as abrasion resistance. On the contrary, if the Mooney viscosity is too high, irregularities are apt to be produced in the surface of the decorating layer 18. Thus, the external appearance may be marred.

In the TPE composition, the EPR is kept in an unbridged state or put into abridged state such as a partial bridged state, a dynamic bridged state, or the like, suitably. When the EPR is bridged, the solvent resistance and the mechanical strength of the TPO can be improved.

B. TPS is made of olefin resin and aromatic-vinyl-conjugate-diene-compound block copolymer or hydrogenated one thereof. The weight ratio of the former to the latter is in a range of from 10/90 to 90/10, preferably in a range of from 30/70 to 80/20.

As the olefin resin, the same as that in the above-mentioned TPO can be used.

Examples of the aromatic-vinyl compound in the copolymer include styrene, α-methylstyrene, p-methylstyrene, vinyl toluene, etc. Of them, styrene is preferable. Examples of the conjugate diene compound include butadiene, isoprene, 1,3-pentadiene, 2,3-dimethyl-1,3-butadiene, etc. Of them, butadiene and isoprene are preferable.

The structure of the copolymer is of a linear block copolymer expressed by the general formula $(A-B)_n$, $A-(B-A)_n$ or $B-(A-B)_n$ (where A designates a copolymer block mainly composed of aromatic vinyl compound, and B designates a copolymer block mainly composed of conjugate diene compound, but the border between the blocks A and B is not always necessary to be distinguished clearly; and where n is an integer of 1 or more) or a branched (radial) block copolymer expressed by the general formula $[(A-B)_n]_m-X$, $[A-(B-A)_n]_m-X$ or $[B-(A-B)_n]_m-X$ (where A and B designates copolymer blocks in the same manner as mentioned above, and X designates a brancher residue; and where n is an integer of 1 or more, and m is an integer of 3 or more).

The number-average molecular weight ($M_n$) of the copolymer is usually in a range of from 5,000 to 500,000, preferably in a range of from 10,000 to 300,000. If the number-average molecular weight is not larger than 5,000, the mechanical strength of TPE becomes low. On the contrary, if the number-average molecular weight is not smaller than 500,000, the viscosity of a polymerization solution becomes high. Thus, polymerization needs to be performed at a low concentration so that the productivity is lowered. It is preferable that the content of aromatic vinyl compound in the copolymer is in a range of from 10 wt % to 50 wt %.

Although the copolymer is used as it is, the copolymer is preferably hydrogenated (reduced in double bond) from the point of view of light resistance, weather resistance, thermal stability, or the like. In addition, EPR may be used together.

The copolymer or the hydrogenated copolymer is used as it is kept unbridged or put into a bridged state such as a full bridged state, a partial bridged state, or the like. If the copolymer is bridged, the solvent resistance or the like of TPS is improved in the same manner as that in the above-mentioned case of TPO. In addition, the mechanical strength is also increased.

A coloring agent (pigment, dye stuff) for decorating is essentially mixed into the above-mentioned TPE composition. Additives such as an inorganic filler such as talc, calcium carbonate, or the like, a fire retardant, a lubricant, an antistat, an age resistor (heat-resistance/light-resistance stabilizer), etc. are suitably added to the TPE composition. After being extruded and kneaded, the TPE composition is granulated (pelletized) to form an extrusion-molding material.

A peroxide unbridged hydrocarbon rubber-like substance represented by polyisobutene, butyle rubber, or the like, and/or a mineral oil softener may be mixed into the TPE composition in accordance with necessity. Then, the loading of the mineral oil softener is usually set to be in a range of from 5 phr to 200 phr.

As the base polymer of the thermoplastic resin composition for forming the thermal bonding layer 22, non-polar thermoplastic resin such as olefin resin, styrene resin, or the like, when the base polymers of the base layer 20 and the decorating layer 18 are non-polar. On the contrary, when the base polymers of the base layer 20 and the decorating layer 18 are polar, polar thermoplastic rein such as vinyl chloride resin, polyester resin, polyamide resin, or the like, is used. Such resins are used for ensuring the heat seal property respectively.

As such olefin resin, copolymers of polyethylene (PE), polypropylene (PP) or propylene with α-olefin the carbon number of which is two or more, or the like, may be used. Of them, low-density polyethylene (LDPE) is especially preferable because it has a low melting point and it is rich in flexibility. Particularly, linear low-density polyethylene (LLDPE) is preferable because it is superior in heat resistance and mechanical strength. Incidentally, the melt temperatures of high-pressure-processed polyethylene (low-density polyethylene), medium-pressure-processed polyethylene (medium-density polyethylene), and low-pressure-processed polyethylene (high-density polyethylene) are 98° C., 120° C. and 124° C., respectively. (See p. 713 of "Handbook of Plastics-Processing Technique, New Edition", edited by "Plastic-Processing Technique Handbook Editorial Committee", published by THE NIKKAN KOGYO SHIMBUN, LTD., Dec. 20, 1977).

The thermoplastic resin composition may be composed of thermoplastic resin alone. However, in order to ensure flowability and tackiness at the time of melting, a softener (plasticizer, process oil, lubricant, etc.), a tackifier, and further an additive such as an age resistor, or the like, are added and mixed suitably. Then, in the same manner as in the case of the TPE composition, those agents are added to thermoplastic resin, extruded and kneaded, and thereafter granulated (pelletized) so as to form an extrusion-molding material.

Then, the thermal bonding layer 22 in the present invention is set to have a thickness with which the bending flexibility of the weather strip (trim) is not blocked when it is attached to the vehicle body. The thickness of the thermal bonding layer 22 is determined by the balance with the ability to hide the ground color of the base layer 20, and further the ability to block the migration of a discoloring agent including a sulfuric agent from the base layer 20 to the decorating layer 18.

For example, in the case of the combination of the base layer 20 of EPDM, the thermal bonding layer 22 of LDPE, and the decorating layer 18 of TPO, the thickness of the thermal bonding layer 22 is set to be in a range of from 40 μm to 300 μm, preferably in a range of from 80 μm to 150 μm. If the thermal bonding layer 22 is too thin, it becomes difficult to ensure the ground color hiding ability and the discoloring agent migration blocking ability described above. On the contrary, if the thermal bonding layer 22 is too thick, it becomes difficult to ensure the bending flexibility of the weather strip when it is attached to the vehicle body.

Incidentally, the thickness of the decorating layer 18 is set to be usually in a range of from 200 μm to 1,000 μm, preferably in a range of from 300 μm to 800 μm. If the decorating layer 18 is too thin, it becomes difficult to obtain an impressive clear color. On the contrary, if the decorating layer 18 is too thick, the loading of a decorating layer material which is more expensive than a base layer material increases.

Next, a method for manufacturing the above-mentioned weather strip will be described about the case where the weather strip as shown in FIG. 1 is manufactured.

Figure 3:
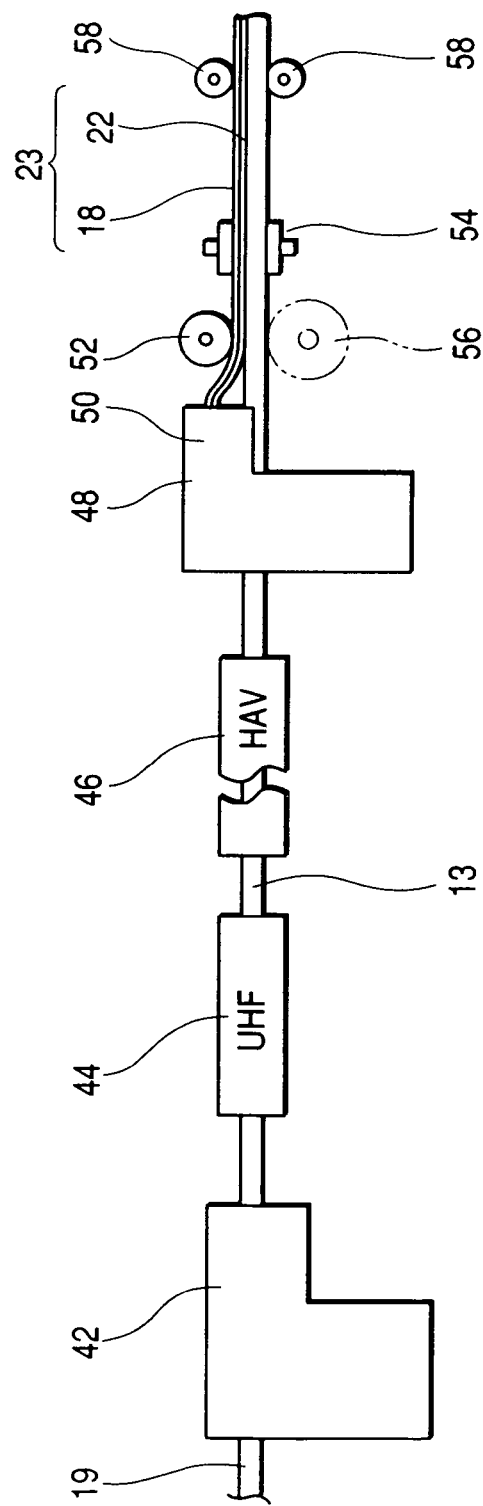
FIG. 3 shows a schematic view showing whole steps of the method for manufacturing the weather strip in FIG. 1.
Figure 4:
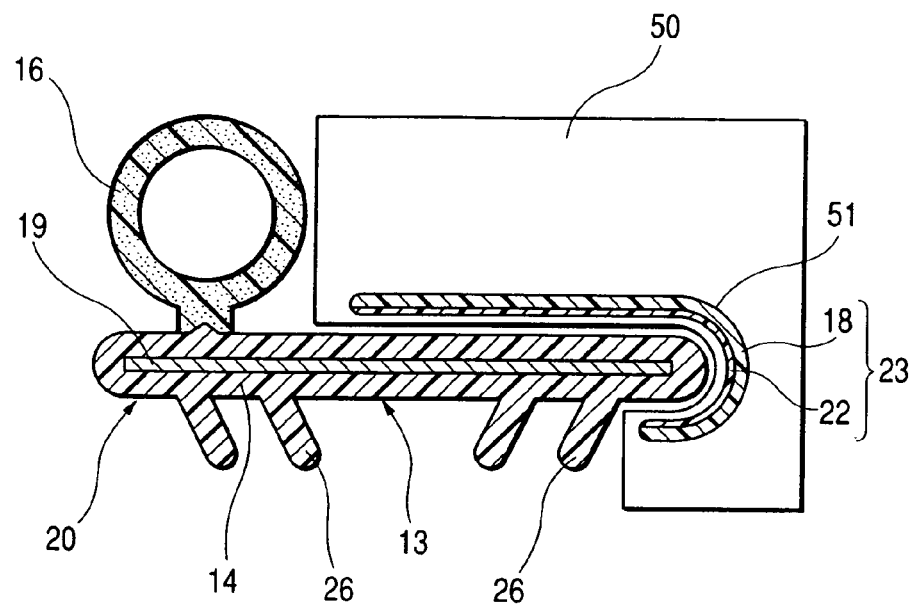
FIG. 4 shows a front view showing the positional relationship between a laminated film extrusion die and a vulcanized rubber extruded body in FIG. 3.

If the method proposed in the above-mentioned Unexamined Japanese Patent Publication No. Hei. 8-230013 is applied to the following manufacturing method, it is easy to control the thickness (see FIGS. 3 and 4). Accordingly, the following method is preferable though other conventional methods can be adopted.

I. First, a cross-head type two-layer extruder 42 for a weather strip body 13 is used to extrude the weather strip body 13 with the base layer 20 and the hollow seal portion 16. Then, the weather strip body 13 is vulcanized by a microwave heater (UHF) 44 and a hot-air vulcanizer (HAV) 46. Thus, the weather strip body 13 is obtained as a vulcanized rubber extruded body.

II. Next, a TPE composition and thermoplastic resin are laminated and extruded (two-layer extruded), respectively, with a predetermined thickness and width by a two-layer extruder 48 for a laminated film, so as to form a laminated film 23 composed of the decorating layer 18 and the thermal bonding layer 22. Then, before being solidified, the laminated film 23 is pressed onto the upper surface of the weather strip body 13 by pressure rollers 52 and 54. Thus, the laminated film 23 is thermally bonded with the weather strip body (base layer) 13 (see FIG. 3). Incidentally, the laminated film 23 is extruded into a predetermined shape in the form in which the thermal bonding layer 22 has been thermally bonded with the lower surface of the decorating layer 18.

That is, the two-layer extruder 48 for a film is disposed in a position where the vulcanizing step (in the illustrated example, outside the exit side of the hot-air vulcanizer 46) of the weather strip body 13 is finished. Further, the first and second pressure rollers 52 and 54 for pressing the laminated film 23 onto the upper surface and the end surface of the weather strip body 13 respectively are sequentially connected to the vicinity of the exit side of a film extrusion die 50 of the extruder 48. Then, in the illustrated embodiment, the reference numerals 58 represent take-up rollers. In addition, a support roller 56 may be disposed correspondingly to the first pressure roller 52 (see the two-dot chain line in FIG. 3).

The thickness of the thermal bonding layer 22 is set to be in a range of from 50 μm to 150 μm, preferably in a range of from 80 μm to 120 μm. On the other hand, the thickness of the decorating layer 18 is set to be in a range of from 400 μm to 600 μm, preferably in a range of from 450 μm to 550 μm.

Here, in the condition that the thermal bonding layer 22 has been set at the melt temperature (100° C. to 130° C. in the case of low-density PE) of the thermoplastic resin (thermal bonding layer 22), the thermal bonding layer 22 is supplied as the laminated film 23 between the first and second pressure rollers 52 and 54 and the base layer 20 (vulcanized rubber extruded body). Thus, a reliable heat seal property is ensured between the base layer 20 and the decorating layer 18. Further, the laminated film 23 is cooled below the melt temperature of the thermoplastic resin in the first and second pressure rollers 52 and 54, and fed forward from the first and second pressure rollers 52 and 54. Thus, the thermal bonding layer 22 is solidified while the decorating layer 18 and the base layer 20 are thermally bonded and integrally connected with each other.

The controlled temperatures of the first and second pressure rollers are usually set to be in a range of from 40° C. to 50° C. The thermoplastic resin is extruded at a higher temperature than the melt temperature thereof so as to form the laminated film 23 together with the decorating layer 18. Then, the thermal bonding layer 22 is pressed and bonded onto the base layer 20 in the condition that the thermal bonding layer 22 can be thermally bonded. Incidentally, it is preferable that the temperature of the weather strip body 13 (base layer 20) is also kept in a range of from 60° C. to 120° C. This is because the thermal bonding layer 22 composed of a thermoplastic resin composition is to be supplied surely between the first and second pressure rollers 52 and 54 and the vulcanized rubber extruded body at a temperature beyond the melt temperature thereof.

As the decorating layer 18, foamed elastomer may be used. Particularly, fine foamed elastomer the expansion ratio of which is in a range of not higher than 1.5, preferably in a range of from 1.05 to 1.45, may be used. In this case, the surface of the decorating layer 18 may be made leathery. Alternately, the surface of the foam may be buffed to fluff the surface of the decorating layer 18. Further, the first pressure roller 52 may be provided as an embossing roller so that the decorating layer 18 is subjected to embossing processing.

Incidentally, when the decorating layer 18 is composed of foamed elastomer, cells of the foam may be collapsed by the pressure by the pressure rollers in a conventional structure where there is no thermal bonding layer. However, the bonding force is improved by the interposition of the thermal bonding layer so that the pressing force of the pressure rollers can be reduced in comparison with the conventional structure in which there is provided no thermal bonding layer. Thus, there is no fear that the cells of the foam are collapsed.

In the above description, the decorating layer 18 provided with the melted thermal bonding layer 22 was pressed onto the base layer (vulcanized rubber body) 20 so as to form a decorating layer. However, the base layer 20, the decorating layer 18 and the thermal bonding layer 22 may be extruded from one extrusion die simultaneously so as to be thermally bonded integrally with each other. Alternatively, a laminated film (a decorating layer provided with a thermal bonding layer) may be pressed and thermally bonded onto the unvulcanized rubber base layer 20 immediately after extrusion. Further, while the laminated film 23 formed like a tape in another position in advance is supplied from a reel, one or both of the thermal bonding layer 22 and the base layer 20 may be heated to a temperature with which the thermal bonding layer 22 can be thermally bonded. Thus, the laminated film 23 is integrated with the base layer 20.

The weather strip manufactured thus is processed so that the trim portion is bent into a U-shape as shown in FIG. 1, and suitably connected like a ring. Then, for use, the weather strip is attached to the vehicle body flange 34 of the vehicle. The weather strip shown in FIG. 2 is manufactured and attached in the same manner. Incidentally, the reference numerals 38 and 38A represent door panels in FIGS. 1 and 2 respectively.

The automobile trim according to the present invention, which is configured thus, has the following operations and effects.

Although the thermal bonding layer is formed of thermoplastic resin which is not flexible compared with TPE, the thermal bonding layer is thin enough not to block the bending flexibility of the automobile trim (weather strip) or the like when it is attached to a vehicle body. Accordingly, the workability of attaching the automobile trim to the vehicle body is the same as that in conventional one.

In addition, due to the presence of the thermal bonding layer, the influence of the ground color of the base layer on the decorating layer is reduced and the migration of a discoloring agent contained in the base layer to the decorating layer is also reduced. Accordingly, a clear bright color or a clear pale color is obtained easily in the decorating layer on the surface of the trim body. In addition, chronological discoloration (yellowing or the like) of the decorating layer caused by the discoloring agent is lowered.

Further, when the base layer is formed of a rubber composition of a fine foam recipe, the thermal bonding layer does not contain an inorganic filler substantially, and it is richer in flowability than TPE. Accordingly, the thermal bonding layer also enters surface pores of the base layer so that the welding strength (bonding strength) increases.

Further, when the decorating layer is formed of a TPE composition of a foam recipe, the surface can be made leathery. In addition, because the thermal bonding layer is provided, the bonding force can be improved. Accordingly, the pressure force of pressure rollers can be reduced in comparison with that in a conventional case where no thermal bonding layer is provided. Thus, there is no fear that cells of the foam are collapsed.

Next, description concerning the specific Example and Comparative are provided.

In a weather strip having a sectional shape shown in FIG. 1, a trim portion was extruded and vulcanized using the following EPDM composition. Then, in the condition that the surface temperature of the trim portion was 90±5° C., a laminated film composed of a decorating layer (500 μm) and a thermal bonding layer (100 μm) was two-layer extruded (extrusion heat temperature: 200° C.) using the following TPO composition and LLDPE. The laminated film was thermally bonded by pressure rollers so that a weather strip of Example was prepared. The temperature of the thermal bonding layer at that time was set to be 120±5° C.

In addition, on similar conditions, instead of the laminated film, a single-layer film composed of only a decorating layer was thermally bonded onto a base layer in the same manner. Thus, a weather strip of Comparative was prepared.

Of the weather strips prepared thus, the decorating layer in the weather strip in Example exhibited clear white, while the decorating layer in the weather strip in Comparative was grayish.

In addition, a light resistance test (83° C.×300 h) was performed on the respective weather strips. The weather strip of Example did not yellow while the weather strip of Comparative yellowed.

EPDM Composition Recipe

| EPDM | 100 parts |
| MAF carbon | 100 parts |
| plasticizer | 60 parts |
| zinc oxide | 10 parts |
| stearic acid | 3 parts |
| sulfur | 1.5 parts |
| vulcanizing accelerator | 5 parts |

TPO Composition

| dynamic vulcanizing TPO (PP/EPDM = 20/80) | 100 parts |
| paraffinic process oil | 5 parts |
| white pigment (TiO$_2$ series) | 1.2 parts |

LLDPE Specification

| melt temperature (JIS K 7121) | 120° C. |
| density (underwater displacement: JIS K 7112) | 0.92 |

Another embodiment of the present invention will be described hereinafter.

Figure 6:
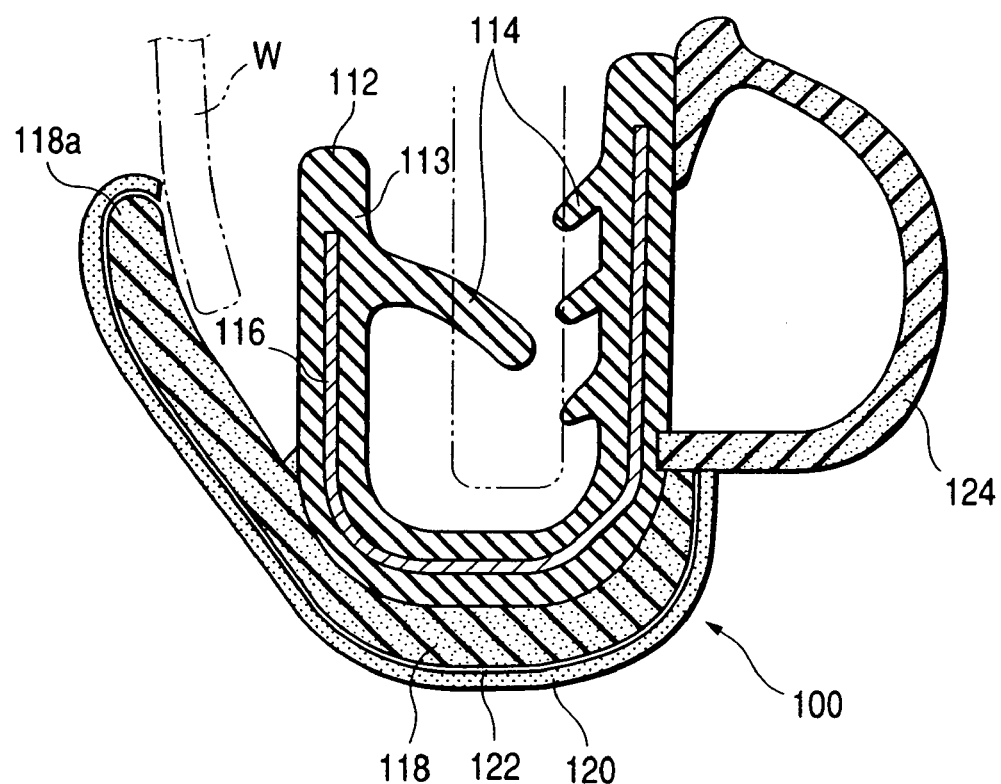
FIG. 6 shows a sectional view showing a still another embodiment of a weather strip according to the present invention.

FIG. 5 is an external appearance view showing an automobile body BD to which a weather strip 100 is attached. Specifically, the weather strip 100 is attached to a circumferential edge portion of a door opening D of the automobile body BD. FIG. 6 is a sectional view showing the weather strip (weather strip door opening trim) 100.

In FIG. 6, the weather strip 100 has an attachment base portion 112 as a base layer, a cushion layer 118, a skin layer 120 as a decorating layer, an olefin bonding layer 122, a hollow seal portion 124, and an outside lip 118a. The attachment base portion 112 is attached to a vehicle-body-side member, and composed of solid rubber of EPDM (solid recipe) which is a kind of EPR. The cushion layer 118 is laminated on the attachment base portion 112, and formed of sponge rubber of EPDM (foam recipe). The skin layer 120 is laminated on the cushion layer 118, and formed by foaming olefin thermoplastic elastomer. The bonding layer 122 bonds the cushion layer 118 and the skin layer 120 with each other. The hollow seal portion 124 is provided to project from one side surface (car-exterior side) of the attachment base portion 112. The outside lip 118a is provided to project from the other side surface (car-interior side) of the attachment base portion 112.

The attachment base portion 112 has a rubber base 113 composed of sectionally U-shaped solid rubber, and support lips 114 projecting toward the inside of the rubber base 113. An insert core 116 is embedded in the rubber base 113 so as to retain the U-shape of the rubber base 113.

The cushion layer 118 has an outside lip 118a projecting to come into pressure contact with an interior member W inside the cabin of the vehicle. The cushion layer 118 is disposed substantially all over the region from the tip end portion of the outside lip 118a to the base portion of the hollow seal portion 124, that is, the prospective decoration area of the rubber base 113 which is exposed in the cabin of the vehicle. The cushion layer 118 is formed of low-density foamed sponge rubber of EPDM at a thickness in a range of from 1 to 8 mm. The cushion layer 118 is formed to sink following external force through the skin layer 120 and restore its original shape in response to the release of the external force. Incidentally, the rubber base 113 and the cushion layer 118 are extruded integrally with each other by simultaneous extrusion molding, and vulcanized simultaneously to be bonded with each other.

Figure 7:
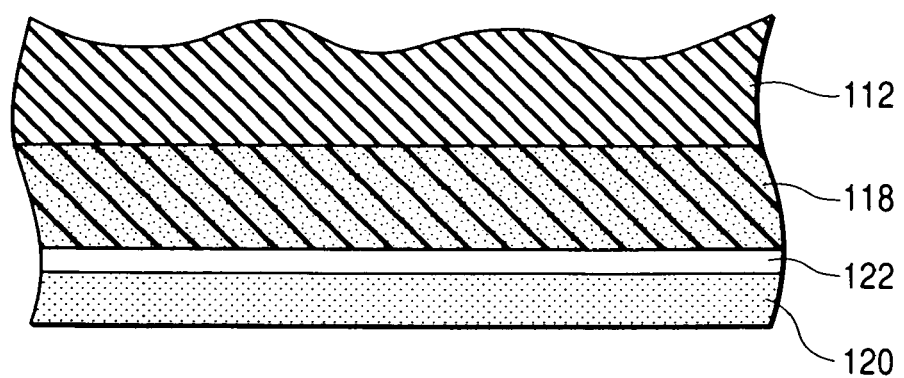
FIG. 7 shows an explanatory enlarged view showing a laminated structure of a cushion layer and a skin layer.

FIG. 7 is an explanatory enlarged view showing the lamination structure of the cushion layer 118 and the skin layer 120. The skin layer 120 is bonded with the cushion layer 118 through the bonding layer 122 for use for thermal bonding. The skin layer 120 is formed into a sheet by foaming olefin thermoplastic elastomer. The thickness of the skin layer 120 is in a range of from 0.3 mm to 0.7 mm. Incidentally, coloring matters, pigments, dye stuffs, or the like, are added to the skin layer 120 so that the skin layer 120 is precolored in a color matched to the color tone of the cabin of the vehicle.

The bonding layer 122 is interposed in the form of a film-like layer between the skin layer 120 and the cushion layer 118 so as to heat-seal them with each other. The bonding layer 122 is formed of polyethylene (PE) having a melting point in a range of from 110° C. to 140° C. The bonding layer 122 is about 0.1 mm thick. The bonding layer 122 carries out not only the operation of bonding but also the operation of blocking a residual sulfuric vulcanizing agent or the like bleeding on the surface after the rubber base 113 and the cushion layer 118 have been vulcanized. Thus, the bonding layer 122 prevents the sulfuric vulcanizing agent or the like from migrating to the skin layer 120. In consideration of such operations, the thickness of the bonding layer 122 is established so as not to lose a soft feeling. In addition, when a film of bright color such as white is used, the bonding layer 122 blocks the black color of the rubber of the sponge rubber cushion layer 118. Thus, the bonding layer 122 carries out the operation of keeping the coloring of the skin layer 120 bright.

The hollow seal portion 124 is formed of sponge rubber so as to project in a hollow state from one side surface (car-exterior side) of the rubber base 113. Thus, the hollow seal portion 124 carries out the operation of sealing in cooperation with a door-side member.

Figure 8:
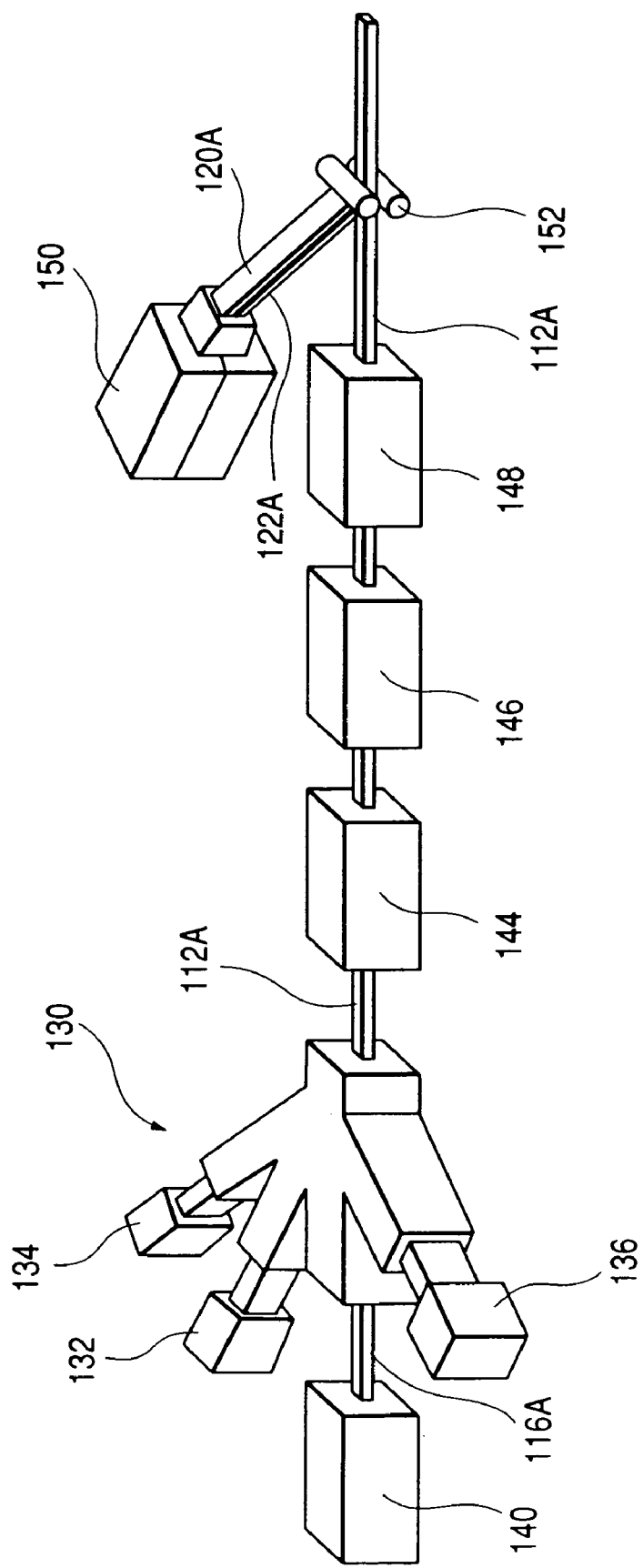
FIG. 8 shows a schematic view showing a production line for the weather strip.

Next, a method for manufacturing the foregoing weather strip 100 will be described with reference to the schematic view of FIG. 8 showing a production line. As shown in FIG. 8, first, the rubber base 113 and so on are extrusion. A cross-head type extruder 130 is used for extrusion-molding. That is, the extruder 130 has a solid rubber extruder 132, sponge rubber extruders 134 and 136, and an insert core feeder 140. The solid rubber extruder 132 has a cylinder and a screw. The cylinder of the extruder 132 is filled with an unvulcanized EPDM solid rubber raw material. Similarly to the extruder 132, each of the sponge rubber extruders 134 and 136 has a cylinder and a screw. The cylinder of each of the extruders 134 and 136 is filled with an unvulcanized EPDM sponge rubber raw material. The insert core feeder 140 provides an insert core member 116A which will be provided as the insert core 116. The extruder 130 carries out so-called co-extrusion. That is, the solid rubber raw material, the sponge rubber raw materials, and the insert core member 116A are supplied simultaneously to one extrusion head and extruded therefrom simultaneously so as to form an extrusion body 112A. Sub-materials such as a reinforcement (carbon black), a plasticizer, a lubricant, a vulcanizing agent, etc. are usually mixed to the EPDM solid rubber raw material and the sponge rubber raw materials. Incidentally, a foaming agent other than those sub-materials is also mixed into the sponge rubber.

In the extrusion body 112A, the portion where the solid rubber raw material has been extruded from the solid rubber extruder 132 is provided as the rubber base 113. The portion where the sponge raw material has been extruded from the sponge extruder 134 is provided as the cushion layer 118. The portion where the sponge raw material has been extruded from the other sponge extruder 136 is provided as the hollow seal portion 124. Then, the cushion layer 118 and the hollow seal portion 124 may be linked to each other. In this case, the same sponge rubber raw material may be extruded for the cushion layer 118 and the hollow seal portion 124 so that the number of the sponge rubber extruders can be reduced to one. For the insert core member 116A, a sheet material composed of stainless steel or steel may be used.

Next, a vulcanization step is carried out. In the vulcanization step, the extrusion body 112A of unvulcanized rubber is passed through a microwave heater (UHF) 144 and a hot-air vulcanizer (HAV) 146 so that the rubber is vulcanized. This step is carried out at a temperature in a range of from 180° C. to 240° C. suitable for vulcanizing EPDM. Incidentally, the vulcanization time (the time to pass through the heater and the vulcanizer) is about in a range of from 3 min to 10 min. The vulcanized extrusion body 112A is passed through a cooling unit 148 so as to be cooled down to about 100° C. Then, in this vulcanization step, the foaming agent in the EPDM sponge rubber expands so that predetermined sponge rubber can be obtained. The above process is substantially same as the process for preparing the weather strip body 113 as aforementioned.

Succeedingly, a step for laminating the skin layer 120 is carried out. That is, in this step, a material in which a foaming agent has been added to thermoplastic elastomer is extruded from an extruder 150 so as to form a skin sheet 120A. At the same time, a bonding sheet 122A composed of PE is extruded from one extrusion head toward the back surface side of the skin sheet 120A so as to form a lamination. As the thermoplastic elastomer, a composition of 80 parts by weight of EPDM and 20 parts by weight of polypropylene (PP) may be used. Incidentally, the thermoplastic elastomer is heated to be in a range of from 200° C. to 260° C. in a cylinder of the extruder 150, so that the thermoplastic elastomer is melted. At this time, the dispersed foaming agent is also melted to start foaming. However, the foam has not reach a cellular state due to the pressure in the cylinder. As soon as the thermoplastic elastomer is extruded from the extrusion head and exposed to the atmospheric pressure, the foam expands to form cells. Thus, the foamed skin sheet 120A is formed.

The lamination sheet of the skin sheet 120A and the bonding sheet 122A is guided to pressure rollers 152. The lamination sheet is pressed onto the extrusion body 112A by the pressure rollers 152. At this time, the temperature of the skin sheet 120A drops down before it reaches the pressure rollers 152. When the skin sheet 120A reaches the pressure rollers 152, the temperature of the skin sheet 120A is in a range of from 120° C. to 140° C., that is lower than the temperature with which the thermoplastic elastomer is thermally deformed. That is, the temperature is so low that the cells are not collapsed. Accordingly, even if the skin sheet 120A is pressed by the pressure rollers 152, the cells are not collapsed, but they recover and keep their foaming state. On the other hand, the bonding layer 122 is formed of PE the melting point of which is in a range of from 110° C. to 140° C. Therefore, even when the bonding layer 122 is guided to the pressure rollers 152, the bonding layer 122 is softened sufficiently so that it can be thermally bonded to the cushion layer 118 easily. Thus, the lamination sheet can be thermally bonded with the cushion layer 118 without increasing the surface temperature of the skin layer 120 and without collapsing the cells of the foam. Through the bonding step with the pressure rollers 152, the skin layer 120 is bonded with the cushion layer 118 through the bonding sheet 122A by thermal bonding.

Succeedingly, the vulcanized extrusion body 112A with the skin layer 120 bonded thereto is cooled by a not-shown cooler. Further, the extrusion body 112A with the skin layer 120 is bent into a U-shape in section by a processing machine. After a step of cutting the extrusion body 112A into predetermined length, or the like, the weather strip 100 in FIG. 6 is completed.

As has been described above, according to the weather strip 100 in this embodiment, because the skin layer 120 is a foamed layer, a soft feeling on the external appearance can be provided in the region where the weather strip 100 is exposed in the cabin of the vehicle. In addition, the cushion layer 118 is provided in the substantially whole region under the skin layer 120. The cushion layer 118 can provide a soft feeling on the sense of touch. Thus, the weather strip 100 can provide a soft feeling not only on the external appearance but also on the sense of touch.

In addition, all of the attachment base portion 112, the cushion layer 118, the bonding layer 122, and the skin layer 120 are formed of materials of olefin series, so that they are thermally bonded with one another firmly, and there is no fear that they peel off. In addition, the bonding layer 122 is formed of PE the melting point of which is low. Thus, even if the temperature of the bonding layer 122 is lowered to temperature with which cells of foam of the skin layer 120 are not collapsed when the skin layer 120 is pressed by the rollers, the PE can be thermally bonded with the cushion layer 118 firmly. Further, because all are formed of materials of olefin series, it is not necessary to use a special two-layer bonding film described in the background art. Thus, the manufacturing cost can be reduced.

Further, the skin layer 120 can be changed easily in accordance with the color tone of the interior member W inside the cabin of the vehicle. It is therefore easy to make the skin layer 120 match to the color tone of the cabin of the vehicle.

In addition, according to the weather strip 100, the processing of bonding the cushion layer 118 and the skin layer 120 is carried out on a continuous production line after the extrusion body 112A has been extruded. Thus, the weather strip 100 is superior in productivity.

Incidentally, the present invention is not limited to the above-mentioned embodiment. For example, the weather strip may be modified as follows.

Figure 9:
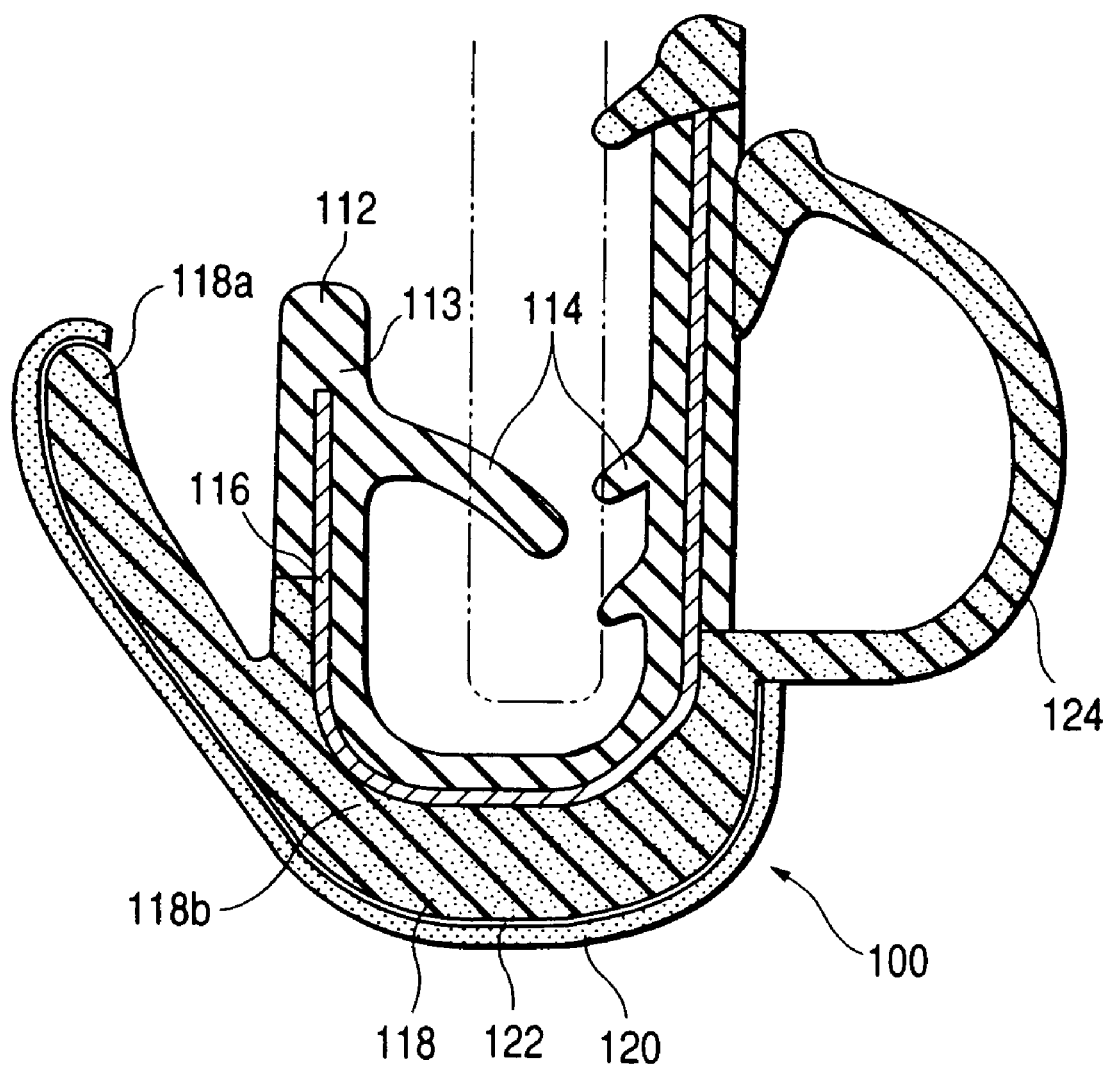
FIG. 9 shows a sectional view showing a still another embodiment of a weather strip according to the present invention.

FIG. 9 is a sectional view illustrating a weather strip 100 showing another embodiment. In the weather strip 100, an outer layer portion 118b which is a part of a sectionally U-shaped attachment base portion 112 outside the insert core 116 is formed of sponge rubber. This outer layer portion 118b belongs to a cushion layer 118. In this case, when a hollow seal portion 124 and an outside lip 118a are also continuously molded integrally, the weather strip 100 can be manufactured by one sponge rubber extruder. In addition, the thickness of sponge rubber can be made larger than that in FIG. 6. Thus, a softer feeling can be obtained.

The skin layer 120 was bonded with the extrusion body 112A by the pressure rollers 152 in the process of manufacturing the weatherstrip 100. However, the present invention is not limited to such a process. The skin layer 120 may be bonded by a bonding agent or the like in another process. In the forgoing, several embodiments have been individually described, however, these embodiments can be combined to the possible extent.

Further, the present invention is not limited to the above-mentioned embodiment. It can be carried out in various modes without departing from the scope of the invention.

What is claimed is:

1. A method for manufacturing an automobile weather strip, comprising steps of:
    extruding ethylene-propylene rubber to form an extrusion body as an attachment base portion and a cushion layer;
    vulcanizing said extrusion body;
    extruding a skin sheet of foamable olefin thermoplastic elastomer to form a foamed skin layer having cells;
    extruding a bonding sheet of an olefin material for forming a bonding layer to be interposed between said skin layer and said cushion layer;
    laminating said foamed skin layer, said bonding sheet and said extrusion body, respectively at predetermined temperatures, to thereby maintain the cells of the foamed skin layer; and
    laminating and pressing said foamed skin layer, said bonding sheet and said extrusion body to thereby thermally bond said foamed skin layer onto said cushion layer through said bonding sheet,
    wherein said rubber includes an EPDM rubber, said foamable olefin thermoplastic elastomer includes a TPO, and said olefin material includes LLDPE.

2. A method for manufacturing an automobile weather strip, comprising the steps of:
    extruding a rubber to form an extrusion body;
    vulcanizing said extrusion body;
    extruding a skin sheet of foamable thermoplastic elastomer to form a foamed skin layer having cells;
    laminating said foamed skin layer and said extrusion body, respectively at predetermined temperatures to thereby maintain the cells of said foamed skin layer; and
    pressing said foamed skin layer and said extrusion body to thereby thermally bond said foamed skin layer onto said extrusion body,
    wherein said rubber includes an EPDM rubber and said foamable thermoplastic elastomer includes a TPO.

3. A method for manufacturing an automobile weather strip, comprising;
    extruding a rubber to form an extrusion body;
    vulcanizing said extrusion body;
    extruding a skin sheet of foamable thermoplastic elastomer to form a foamed skin layer having cells;
    extruding a bonding sheet of an olefin material to be interposed between said foamed skin layer and said extrusion body;
    laminating said foamed skin layer sheet, said bonding sheet and said extrusion body, respectively at predetermined temperatures to thereby maintain the cells of said foamed skin layer; and
    pressing said foamed skin layer, said bonding sheet and said extrusion body to thereby thermally bond said foamed skin layer onto said extrusion body through said bonding sheet,
    wherein said rubber includes an EPDM rubber, said foamable olefin thermoplastic elastomer includes a TPO, and said olefin material includes LLDPE.

4. A method for manufacturing an automobile weather strip according to claim 3, wherein said extrusion body includes an attachment base portion and a cushion layer, and said foamed skin layer is bonded onto said cushion layer through said bonding sheet.

* * * * *